Patented Sept. 18, 1928.

1,684,654

UNITED STATES PATENT OFFICE.

GEORGE ALBERS, OF SEATTLE, WASHINGTON.

SOYA-BEAN FLOUR AND PROCESS OF PRODUCING THE SAME.

No Drawing.  Application filed November 14, 1925. Serial No. 69,198.

The present invention relates to the production of a new commodity which is termed soya bean flour, and which has application in the industries and in medicine.

One of the objects of the invention is the production of a novel flour from soya beans; a second object of the invention is the provision of a novel process for the production of soya bean flour; and a further object of the invention is the production by an unique process of a new commodity adapted to be substituted for casein.

In the production of the article hereinafter described, soya bean cake is obtained. Such soya bean cake is a product of the oil mills, generally in Manchuria, and from which soya bean oil has been extracted, generally by expression. The product referred to is imported into this country in cake form.

As an initial step in the process, the cake is broken up. Any suitable mechanical appliance or apparatus may be used for this purpose.

The broken up cake is next ground into a meal. The meal is dried until the moisture contained therein is reduced to approximately ten (10%) per cent. The soya bean cake received in this country not infrequently contains as much as fifteen (15%) per cent moisture.

The dried meal is cooled, after which it is ground, and again dried, the amount of moisture contained after the second drying process being about eight (8%) per cent. This dried product is then ground into a flour, usually by a series of reducing grindings beginning with a coarse grinding and accompanied by continuous bolting, the bran or fiber being removed in this process, and reduced as an incident thereto, from approximately five and one-half ($5\frac{1}{2}\%$) per cent to three (3%) per cent. By so doing, the gluten or protein content of the flour is increased from approximately forty-two (42%) per cent to forty-five (45%) per cent. The flour is ground to a fineness which will permit it to go through a number seventy-two mesh silk cloth.

In the process of drying which is above described, the apparatus employed is a regular mill drier and sterilizer. The process of drying is a continuous one for the flour enters one end and is discharged from the other. The internal mechanisms of said driers include a cluster of steam pipes, which revolve constantly and keep throwing the flour upon the pipes, in which is carried a steam heat of about 200 degrees Fahrenheit.

As a result of the process which has been described there is an increase in the proportion of protein, and reduction in moisture content, and reduced fiber content. Analysis shows that the moisture is approximately eight and six tenths, ($8\frac{6}{10}\%$) per cent, ash five and three tenths ($5\frac{3}{10}\%$) per cent, protein forty-seven and two tenths ($47\frac{2}{10}\%$) per cent and crude fiber three (3%) per cent.

There is a probable market for this flour to be used in preventing diabetes. Physicians have apparently found that foods having high protein content with the elmination of starch suffice to provide a proper remedy for persons affected with this disease. The product commercially and when prepared by the process which has been described is being used in the place of casein for glue purposes. So far as is known, it is new and novel to produce a flour from soya bean cake, and certainly the product which is here described is new in the art. The process whereby it is produced is the result of long experiments and has only been perfected as a result of tedious tests.

I claim:

1. A process for making soya bean flour comprising comminution of soya bean cake, followed by drying, further comminution, additional drying, and pulverization.

2. A process of producing soya bean flour which includes the steps of breaking up soya bean cake, drying the broken cake, pulverization of the dried residue, and reduction of the percentage of fiber content present.

3. A process of producing soya bean flour which consists of alternately drying and comminuting soya bean cake until the moisture content thereof is below ten per cent and said cake is fine enough to pass through a 72-mesh silk cloth.

4. As a new article of manufacture, soya bean flour fine enough to pass through a 72-mesh silk cloth and having a moisture content lower than ten per cent, such flour being derived from soya bean cake by a series of reducing grindings beginning with a relatively coarse reduction whereby the percentage of fiber therein is lowered.

5. Soya bean flour comprising the residue obtained from soya bean cake by a series of grindings, each grinding being accompanied by desiccation of the product, and the reduction in the percentage of the fiber present and the product subjected to continuous bolting.

G. ALBERS.